United States Patent [19]
Bradley

[11] Patent Number: 5,821,897
[45] Date of Patent: Oct. 13, 1998

[54] SIMULATOR FOR TESTING A COLLISION AVOIDANCE RADAR SYSTEM

[75] Inventor: Donald A. Bradley, Morgan Hill, Calif.

[73] Assignee: Wiltron Company, Morgan Hill, Calif.

[21] Appl. No.: 771,051

[22] Filed: Dec. 20, 1996

[51] Int. Cl.⁶ .................................................. G01S 7/40
[52] U.S. Cl. ........................... 342/165; 342/169; 342/174
[58] Field of Search .............................. 342/70, 165, 168, 342/169, 170, 171, 172, 173, 174

[56] References Cited

U.S. PATENT DOCUMENTS

| | | | |
|---|---|---|---|
| 3,745,579 | 7/1973 | Lott | 342/171 |
| 3,832,712 | 8/1974 | Goetz et al. | 342/168 |
| 3,860,925 | 1/1975 | Darboven, Jr. | 342/109 |
| 3,924,341 | 12/1975 | Edelsohn | 342/171 |
| 4,209,786 | 6/1980 | Barley et al. | 342/171 X |
| 4,435,712 | 3/1984 | Kipp | 343/17.7 |
| 4,477,811 | 10/1984 | Collins, IV | 434/5 |
| 4,660,041 | 4/1987 | Maples et al. | 342/170 |
| 4,686,534 | 8/1987 | Eddy | 342/165 |
| 4,970,519 | 11/1990 | Minnis et al. | 342/165 |
| 4,972,192 | 11/1990 | Bruder | 342/6 |
| 5,111,208 | 5/1992 | Lopez | 342/174 |
| 5,546,090 | 8/1996 | Roy, III et al. | 342/174 |
| 5,677,696 | 10/1997 | Silverstein et al. | 342/360 |
| 5,721,554 | 2/1998 | Hall et al. | 342/165 |

FOREIGN PATENT DOCUMENTS

| | | | |
|---|---|---|---|
| 0 182 418 | 5/1986 | European Pat. Off. | G01S 7/40 |
| 0 359 911 | 3/1990 | European Pat. Off. | G01S 13/34 |
| 0 427 206 | 5/1991 | European Pat. Off. | G01S 13/28 |
| 0 667 536 | 8/1995 | European Pat. Off. | G01S 7/40 |
| 08102771 | 9/1994 | Japan | H04L 27/227 |

*Primary Examiner*—John B. Sotomayor
*Attorney, Agent, or Firm*—Fliesler, Dubb, Meyer & Lovejoy

[57] ABSTRACT

A simulator for testing the performance accuracy or calibrating a collision avoidance radar system. The simulator includes circuitry for receiving a signal from the collision avoidance radar system and for generating a signal tracking the frequency of the radar system. Circuitry is further included in the simulator utilizing the tracking signal to generate a signal offset in frequency from the collision avoidance radar system output signal and to transmit the offset signal to the collision avoidance radar. The offset is controlled so that the collision avoidance radar should indicate an object is located a distance (D) away. Circuitry is further included in the simulator so that the offset has a first value when the radar system output is increasing in frequency and a second value when the radar system output is decreasing in frequency. The first and second offset values are controlled so that the radar system should indicate an object is moving at a rate (dD/dt) upon receiving the offset signal. The simulator further indicates the frequency range and amplitude of the radar system output as determined from the tracking signal.

13 Claims, 4 Drawing Sheets

SIMULATOR FOR TESTING A COLLISION AVOIDANCE RADAR SYSTEM

BACKGROUND OF THE INVENTION

1. Field of the Invention

The present invention relates to a device for testing the performance accuracy or calibrating a collision avoidance radar system.

2. Description of the Related Art

Figure 1:
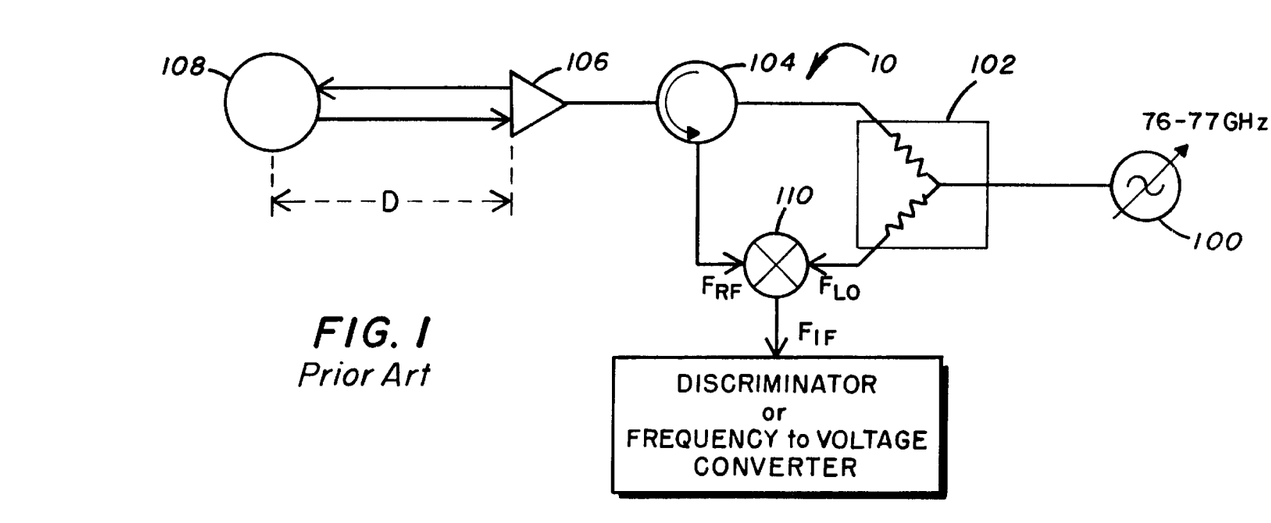
FIG. 1 shows components of a collision avoidance radar system along with a simulator to test the performance accuracy of the radar system.

FIG. 1 shows components of a collision avoidance radar system 10 along with a $1^2$ meter metal plate 108 typically utilized as a simulator to test the performance accuracy of the radar system.

The collision avoidance radar system 10 shown in FIG. 1 is typically installed in an automobile with the antenna 106 in the front or grill area of the automobile. The system operates by transmitting a signal from the antenna 106 and determining from a signal received back the distance (D) the antenna 106 is from simulator 108 or other reflecting object, such as another automobile. From the received signal, the radar system 10 can also determine the rate (dD/dt) the object or other vehicle is moving. By processing the received signal, an alarm or other device can be activated to enable the vehicle operator to avoid a collision with the object or vehicle.

The system shown in FIG. 1 includes a oscillator 100 configured to sweep over a range of frequencies. The output of oscillator 100 is provided to a splitter 102. A first output of splitter 102 is provided as a local oscillator signal ($F_{LO}$) to the first input of a mixer 110. A second output of the splitter 102 is provided to isolator 104. The isolator 104 provides the signal from the splitter 102 to the input of the antenna 106 to be transmitted, and provides the signal received from the antenna 106 as an RF signal ($F_{RF}$) to a second input of mixer 110.

Figure 2:
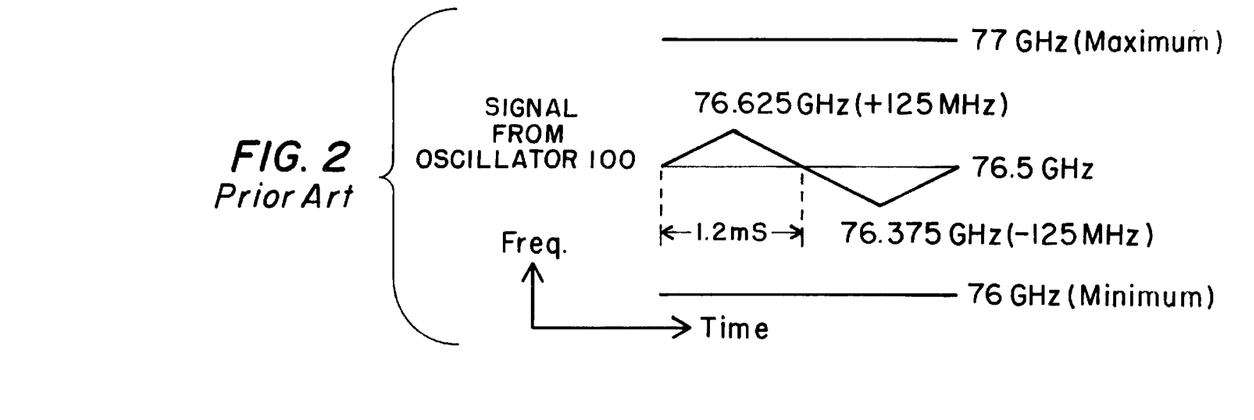
FIG. 2 illustrates a 250 MHz range of frequencies provided from an oscillator of FIG. 1 during a 1.2 ms time period.

The oscillator 100 typically sweeps through a range of frequencies having a minimum of 76 GHz and a maximum of 77 GHz. The 76–77 GHz range is assigned by the Federal Communications Commission (FCC) for collision avoidance radar systems. The oscillator 100 typically sweeps through a 250 MHz range of frequencies within the 76–77 GHz limits in a 1.2 msec time period as illustrated in FIG. 2. In FIG. 2, the sweep range is centered at 76.5 GHz, but the 250 MHz range may also be found centered closer to one of the 76 GHz or 77 GHz limits.

Figure 3:
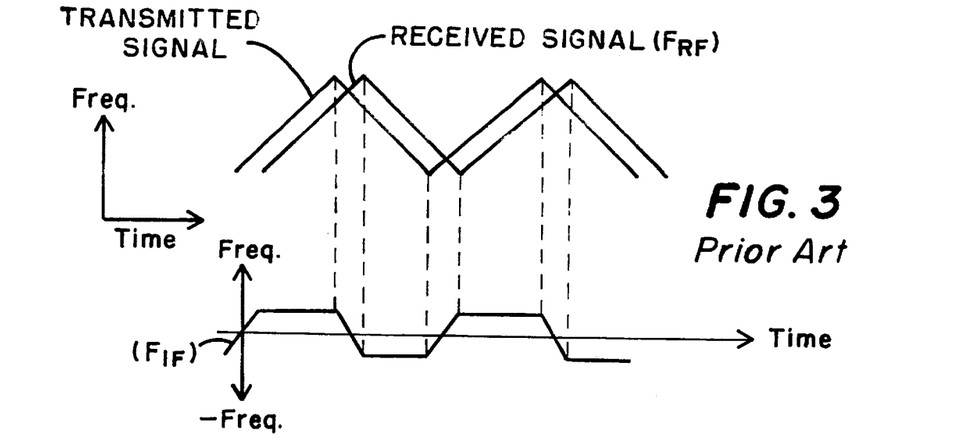
FIG. 3 shows transmitted and received signals from the radar system of FIG. 1 along with a signal $F_{IF}$ which is the difference in the transmitted and received signals.

The signal provided from the oscillator 100 is provided through the isolator 104 and antenna 106 as a transmitted signal which is illustrated in FIG. 3. A reflected signal is then received by the antenna 106 and provided by the isolator 104 as the $F_{RF}$ signal, also as illustrated in FIG. 3. The received signal is shown in FIG. 3 shifted in frequency from the transmitted signal and will be shifted in frequency dependent on the distance D, shown in FIG. 1. The distance D is a distance which a reflecting object, such as the $1^2$ meter metal spherical; and standard 108, is located from the antenna 104. If the distance D is zero, no frequency shift will occur between the transmitted and received signals.

Figure 4:
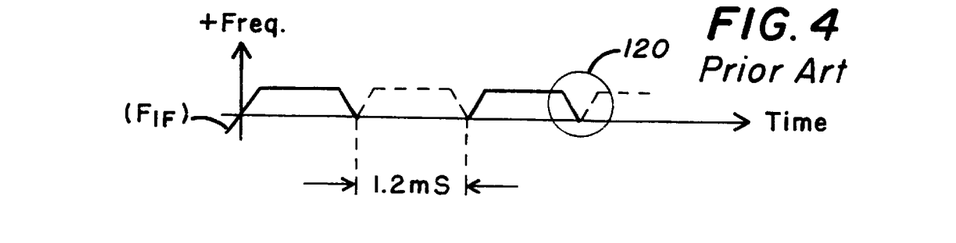
FIG. 4 shows a signal provided from the mixer of the radar system of FIG. 1.

FIG. 3 also shows an intermediate frequency signal $F_{IF}$ which is the difference in the transmitted signal $F_{LO}$ and the received signal $F_{RF}$ provided at the inputs of mixer 110. Because the mixer 110 cannot distinguish between positive and negative, the actual signal provided from mixer 100 $F_{IF}$ is a positive frequency signal changing with time as illustrated in FIG. 4. The frequency of the signal $F_{IF}$ output from mixer 110 is converted to a corresponding voltage by a discriminator, or frequency to voltage converter 112. Since transitions such as 120 occur at regular 1.2 msec intervals, as shown in FIG. 4, the transitions 120 can be filtered out by the discriminator 112. The voltage output from discriminator 112 can then be processed to determine the distance D.

An equation for determining the distance D based upon the frequency value of $F_{IF}$ output from mixer 110 can be derived as shown below with knowledge of the 250 MHz sweep range and 1.2 ms time period provided by oscillator 100. First, time (t) in seconds is related to the distance D in meters and the speed of light (c) as follows:

$$t = D/c \quad (1)$$

where $c = 299.8 \times 10^6$ meters/sec. Further, the frequency difference in the transmitted and received signals $F_{IF}$ is related to time t as follows:

$$F_{IF} = t\Delta t / \Delta f \quad (2)$$

where $\Delta f$ is the frequency sweep range provided by oscillator 100, and $\Delta t$ is the time period over which the frequency range is swept by oscillator 100. Combining equations (1) and (2), $F_{IF}$ is obtained in terms of D as follows:

$$F_{IF} = D\Delta f / c\Delta t \quad (3)$$

D in terms of $F_{IF}$ is then:

$$D = F_{IF} c \Delta t / \Delta f \quad (4)$$

With $\Delta f = 250$ MHz and $\Delta t = 1.2$ msec, a frequency difference $F_{IF}$ of 695 Hz will be provided for a distance D of 1 meter as seen from equation (4).

Figure 5A:
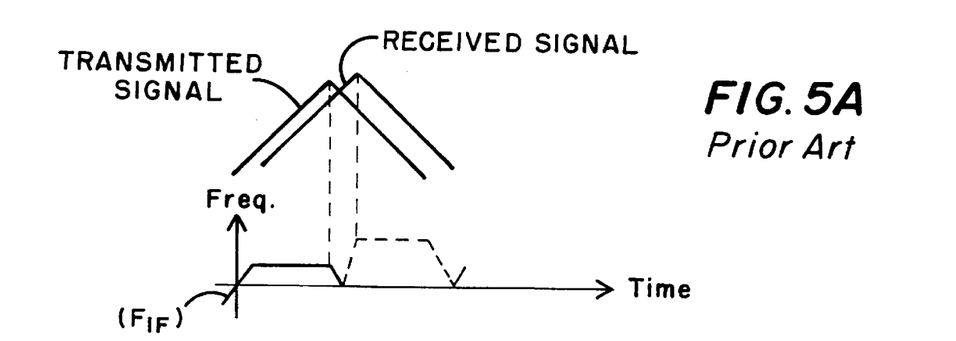
FIG. 5A shows transmitted and received signals from the radar system of FIG. 1 when an object is moving farther away from the radar system, along with a signal $F_{IF}$ provided from a mixer of the radar system.
Figure 5B:
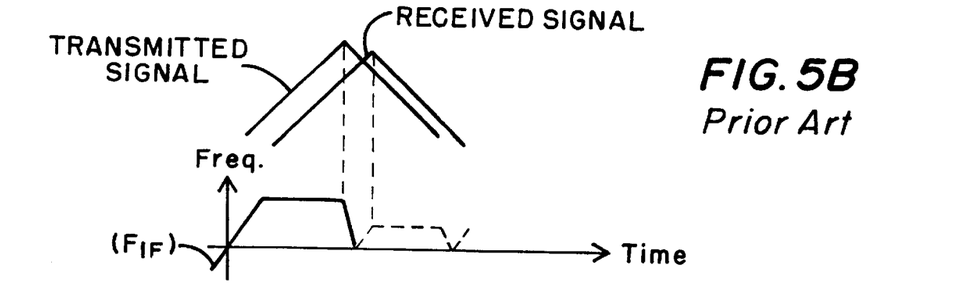
FIG. 5B shows transmitted and received signals from the radar system of FIG. 1 when an object is moving closer to the radar system, along with a signal $F_{IF}$ provided from a mixer of the radar system.

The rate an object is moving toward or away from the antenna 106, or the change in D with respect to time (dD/dt) can also be determined by the circuitry of FIG. 1. With the object, such as simulator 108, moving farther away from the antenna 106, the received signal will increase in frequency relative to the transmitted signal as shown in FIG. 5A. With an object moving away, frequency $F_{IF}$ provided from mixer 110 during a period $\Delta t$ when the transmitted signal is increasing in frequency will be smaller than during a period $\Delta t$ when the transmitted signal is decreasing in frequency, dependent on dD/dt, as illustrated in FIG. 5A. With an object moving closer to the antenna 106, the received signal will decrease in frequency relative to the transmitted signal as shown in FIG. 5B. With an object moving closer, frequency $F_{IF}$ provided from mixer 110 during a period when the transmitted signal is increasing in frequency will then be larger than during a period when the transmitted signal is decreasing in frequency, dependent on dD/dt, as further illustrated in FIG. 5B. By measuring the difference in frequency between sweep periods, dD/dt can, thus, be determined.

To assure proper performance of the collision avoidance radar of FIG. 1, the device must be regularly tested or calibrated. During calibration, assurances must be made that the oscillator 100 is operating inside the 76–77 GHz range specified by the FCC, even though the radar may be functioning properly outside that range. Further, the 250 MHz sweep range $\Delta f$ and 1.2 msec sweep period $\Delta t$ must be verified to assure accurate distance calculations are being made using equation (4). A receiver is typically connected to the oscillator 100 during calibration to assure the oscillator is functioning properly.

Calibration is also performed using the simulator 108 to check that the radar indicates proper distances D accurately up to 100 meters. The simulator 108 is also utilized to assure the radar system indicates proper change in distance measurements dD/dt as described above.

A disadvantage of utilizing the $1^2$ meter metal spherical standard for a simulator, however, is that a large area is required for performing simulation. Another disadvantage is the awkwardness in moving the plate a specified distance during a specified time to determine dD/dt.

SUMMARY OF THE INVENTION

The present invention enables testing a collision avoidance radar system while using significantly less space than a $1^2$ meter metal spherical standard requires. Further, dD/dt tests can be made without requiring the awkward movement of equipment as is required with a $1^2$ meter sphere simulator.

The present invention also enables testing the frequency sweep range Δf and time period Δt of a signal provided from oscillator 100 without requiring that additional test equipment be connected to the oscillator.

The present invention is a simulator including circuitry for receiving a signal from a collision avoidance radar system as shown in FIG. 1 and for generating a signal tracking the frequency of the radar system. The simulator of the present invention further includes circuitry which utilizes the generated tracking signal to generate a signal offset in frequency from the collision avoidance radar system output signal and to transmit the offset signal to the collision avoidance radar. The offset is controlled so that the collision avoidance radar should indicate an object is located a distance (D) away.

The present invention further includes circuitry controlling the offset to have a first value when the radar system output is increasing in frequency and a second value when the radar system output is decreasing in frequency so that the offset signal causes the output of mixer 110 to appear as shown in FIGS. 5A and 5B. The first and second offset values are controlled so that the radar system should indicate an object is moving at a rate (dD/dt) upon receiving the offset signal.

The simulator further includes components to indicate the frequency range and amplitude of the radar system output as determined from the tracking signal which it generates.

BRIEF DESCRIPTION OF THE DRAWINGS

Further details of the present invention are explained with the help of the attached drawings in which.

DETAILED DESCRIPTION

Figure 6:
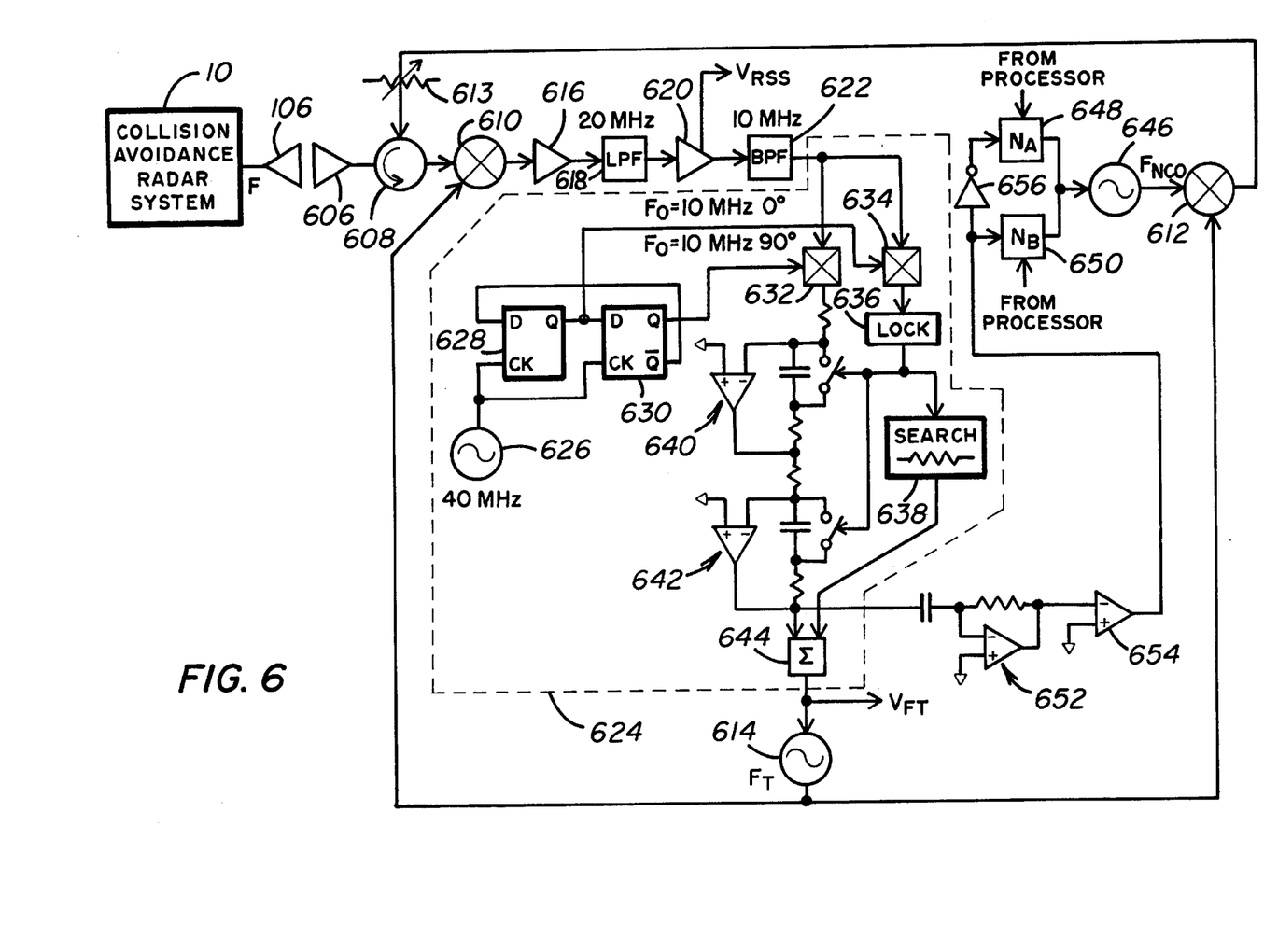
FIG. 6 shows a simulator of the present invention utilized to test or calibrate a collision avoidance radar system.

FIG. 6 shows a simulator of the present invention utilized to test or calibrate a collision avoidance radar system 10 as shown in FIG. 1. The simulator includes an antenna 106 which in operation is placed immediately next to the antenna 606 of the collision avoidance radar system 10. The antenna 606 is connected to an isolator 608 which provides a received signal (F) received from the radar system 106 to a first input of mixer 610. The isolator 608 is also connected to the output of a mixer 612 to provide a signal from mixer 612 as a transmitted signal through antenna 606 to the radar system 10. An attenuator 613 is connected between mixer 612 and isolator 608 so that a signal transmitted from the antenna 606 will simulate the signal strength of a similar signal reflected from an object at a distance D.

A tracking signal $F_T$ is provided to a second input of mixer 610 and mixer 612 by a voltage controlled oscillator (VCO) 614. The tracking signal $F_T$ is controlled to track the received signal F with a frequency offset by a reference signal Fo. The reference signal Fo in FIG. 6 is assumed to be 10 MHz, although other values may be chosen.

When the signal $F_T$ is tracking the signal F with an offset Fo, the output of mixer 610 will be a signal having the reference frequency Fo along with broadband noise. The output of the mixer 610 is provided through a preamplifier 616 to a low pass filter 618. The low pass filter 618 functions to limit broadband noise in a signal applied to amplifier 620 so that the signal to noise ratio for the amplifier 620 is within acceptable limits. Here, the filter 618 is shown to be a 20 MHz filter, assuming Fo=10 MHz. The amplifier 620 provides a relative signal strength signal ($V_{RSS}$) test connection enabling an amplitude of the signal F from the collision avoidance radar system to be determined. The amplifier 620 further provides a square wave output with a fixed amplitude to bandpass filter 622. The bandpass filter 622 provides a fixed amplitude sine wave output having a bandpass range centered on the reference signal Fo, here 10 MHz.

A phase detector 624 receives the output of bandpass filter 622. The phase detector 624 compares the signal from filter 622 with the reference signal Fo and provides an output indicating any difference to the voltage control input of VCO 614. The phase detector 624, which is preferred, has components illustrated in FIG. 6 which are found in a Wiltron 360 Analyzer manufactured by Wiltron Company, Morgan Hill, Calif. The phase detector 624 is a quadrature phase detector as configured in the Wiltron 360 Analyzer because the signal $F_T$ could be F±Fo, and the circuitry of the phase detector 624 enables detection of a desired one of the signals, preferably F+Fo, so that the tracking signal $F_T$ can be used to accurately measure the frequency of the collision avoidance radar signal F. For example, with F=76.5 GHz and Fo=10 MHz, with a phase detector which cannot distinguish between F−$F_T$ or $F_T$−F when phase lock is obtained, the signal $F_T$ could be either 76.51 GHz or 76.49 GHz. The phase detector 624 configured as shown would enable detection of only the 76.51 GHz signal.

To generate the reference signal Fo, the phase detector 624 includes an oscillator 626 and two D-type flip-flops 628 and 630. The oscillator 626 provides a signal four times the reference signal frequency, here 40 MHz, to the clock inputs of flip-flops 628 and 630. The Q output of flip-flop 628 is connected to the D input of flip-flop 630. The $\overline{Q}$ output of flip-flop 630 is connected to the D input of flip-flop 628. As connected, the Q outputs of the flip-flops 628 and 630 each provide the 10 MHz signal Fo, the Q output of flip-flop 628 being 90 degrees out of phase with the Q output of flip-flop 630.

The Q output of flip-flop 628 is provided to a first input of multiplier 634 and the Q output of flip-flop 630 is provided to a first input of multiplier 632. Second inputs of multipliers 632 and 634 are provided from filter 622. The output of multiplier 634 is provided to a lock signal generator 636.

The lock signal generator 636 provides an unlock signal when the signal provided from multiplier 634 from bandpass filter 622 is absent or is $F-F_T$, and a lock signal when the signal provided to multiplier 634 by bandpass filter 622 is $F_T-F$. The lock signal generator output is provided to a search signal generator 638, as well as to integrators 640 and 642 connected in series to the output of multiplier 632.

The search signal generator 638 provides an output through summer 644 to the input of oscillator 614. The search signal generator 638 provides a continuously sweeping signal to sweep a frequency at the VCO 614 output through the range of possible frequencies for F when the lock signal generator 636 indicates an unlocked condition. The search signal generator 638 has its output signal disabled when the lock signal generator indicates a locked condition when the signal $F_T$ is tracking the signal F with an offset of Fo.

The series integrators 640 and 642 likewise provide a signal through summer 644 to the input of VCO 614. The integrators 640 and 642 each include a switch connected in parallel with a capacitor. The switch is controlled by the output of the lock signal generator to be closed in an unlocked condition and opened in a locked condition. In an unlocked condition integrators 640 and 642 are disabled and the output of multiplier 632 is provided to summer 644 with a low gain and a finite phase error. However, in a locked condition, integrators 640 and 642 are enabled and provide a signal from multiplier 632 with a zero phase error and high gain through summer 644 to control the VCO 614 input so that the signal $F_T$ tracks the signal F with an offset Fo.

In operation, the lock signal generator 636 will initially be in an unlocked state. The search signal generator 638 will then provide a sweeping voltage to summer 644 causing the signal $F_T$ from VCO 614 to sweep through frequencies of approximately 76–77 GHz. Further, the lock signal generator will disable integrators 640 and 642 so the multiplier 632 will provide a low gain signal path to VCO 614 which will momentarily phase lock VCO 614 if the search signal generator 638 causes VCO 614 to sweep through F±Fo. If the signal $F_T$ is not equal to F±Fo, the DC signal provided from multiplier 634 to lock signal generator 636 will be 0 volts. If the signal $F_T$=F–Fo, the DC signal provided from multiplier 634 to lock signal generator 636 will be an average positive voltage value. If the signal $F_T$=F+Fo, the DC signal provided from multiplier 634 to lock signal generator 636 will be an average negative voltage value. The lock signal generator 636 is preferably set to indicate lock only when the output of multiplier 634 indicates $F_T$=F+Fo. If $F_T$ is not equal to F±Fo, the lock signal generator 636 will continue providing a signal indicating an unlocked condition and search signal generator 638 will continue sweeping a voltage at its output. If $F_T$=F+Fo, the lock signal generator 636 will disable search signal generator 638, and enable integrators 640 and 642 enabling the signal $F_T$ to be phase locked with the signal F plus an offset Fo. Note that although the lock signal generator 636 indicates lock when $F_T$=F+Fo, it may be alternatively set to indicate lock when $F_T$=F–Fo by accepting the average positive voltage value.

To provide an indication of the frequency of F, the voltage control input to VCO 614 is provided as a test connection to provide the signal $V_{FT}$. The signal $V_{FT}$ enables determination of the frequency of F when phase lock is obtained without requiring a connection to the oscillator 100 of the collision avoidance radar system 10 shown in FIG. 1 as in previous test configurations.

Figure 7:
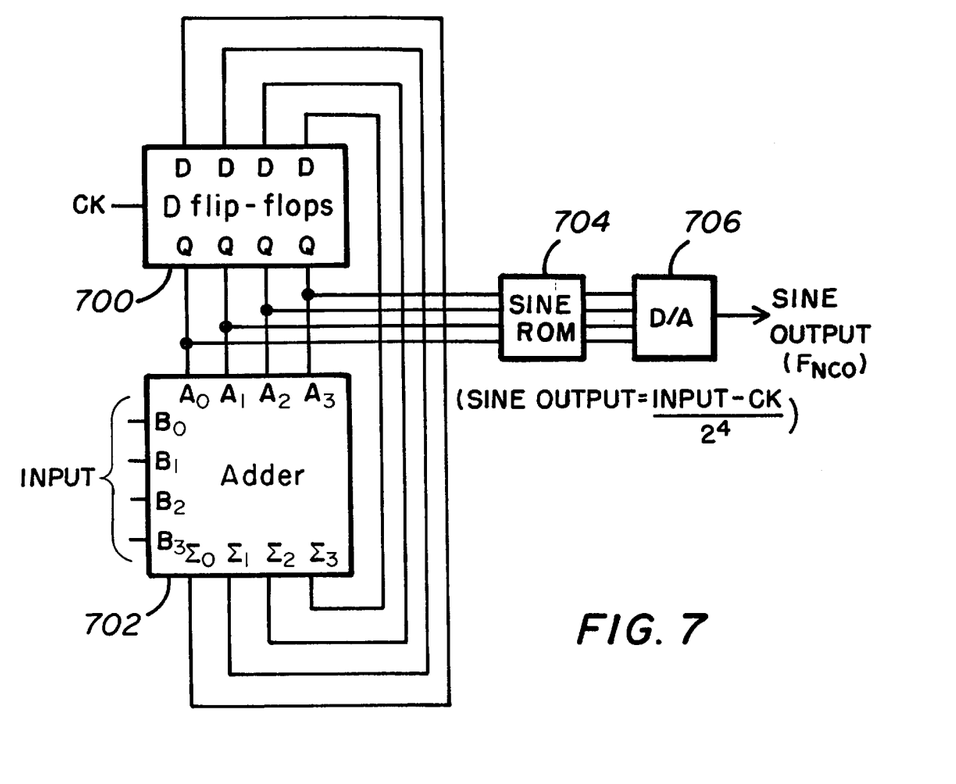
FIG. 7 shows a typical configuration for a numerically controlled oscillator (NCO)

A second input of mixer 612 is connected to the output of a numerically controlled oscillator (NCO) 646. A typical 32 bit NCO is the Analog Devices AD9850. A configuration for a 4 bit NCO 646 is shown in FIG. 7, although a 32 bit NCO is preferably utilized. The NCO of FIG. 7 includes a series of D flip-flops 700 with Q outputs connected to a first set of inputs $A_{0-3}$ of an adder 702. Outputs $\Sigma_{0-3}$ of the adder 702 are then fed back to the D inputs of the flip-flops 700. A second set of inputs $B_{0-3}$ to the adder are provided as an input (INPUT) to the NCO. The Q outputs of flip-flops 700 are further provided through a sine output read only memory (SINE ROM) 704 and D/A converter 706 to provide the output of the NCO ($F_{NCO}$.)

In operation, a count provided by adder 702 will proceed with the clock (CK) provided to flip-flops 700 and proceed in increments depending on the $B_{0-3}$ input to the adder 702. For instance, if the $B_{0-3}$ input is 0001, the count will proceed by binary 1's, or if the $B_{0-3}$ input is 0010, the count will proceed by binary 2's. The SINE ROM 704 output will then increase in value until overflow of the adder 702 and then reset creating a signal at the output (SINE OUTPUT) of the D/A converter 706 having a frequency controlled by the $B_{0-3}$ input. For the four bit NCO of FIG. 7, the output of the NCO $F_{NCO}$=SINE OUTPUT=(INPUT) (CK)/$2^4$.

An input (INPUT) to the NCO 646 in FIG. 6 is provided from registers 648 and 650. The values $N_A$ and $N_B$ stored in registers 648 and 650 and an appropriate CK provided to the NCO 646 enables the NCO 646 to provide a signal $F_{NCO}$ having the frequency of the reference signal Fo offset by an amount $\Delta F$ as controlled by registers 648 and 650.

The output of mixer 612 will be $F_T \pm F_{NCO}$. The signal $F_T + F_{NCO}$ will be above the range of frequencies accepted by the collision avoidance radar 10 and will be filtered out as long as Fo is selected as a high enough value, such as the 10 MHz signal suggested. With $F_T$ being F+Fo, and $F_{NCO}$ being Fo–$\Delta F$, the output of mixer 612 provided to the collision avoidance radar system will then be $F_T-F_{NCO}$=(F+Fo)–(Fo–$\Delta F$)=F+$\Delta F$. The values stored in registers 648 and 650 are provided by a processor and controlled so that offset $\Delta F$ will cause the collision avoidance radar system 10 to indicate an object is located a chosen distance D away.

Two separate registers 648 and 650 are utilized to enable the offset $\Delta F$ to be controlled to cause the collision avoidance radar system 10 to indicate an object is moving at a rate dD/dt. To control the registers 648 and 650 so that $\Delta F$ can indicate a rate dD/dt, the circuit of FIG. 6 includes a differentiator 652, comparator 654 and inverter 656.

Figure 8:
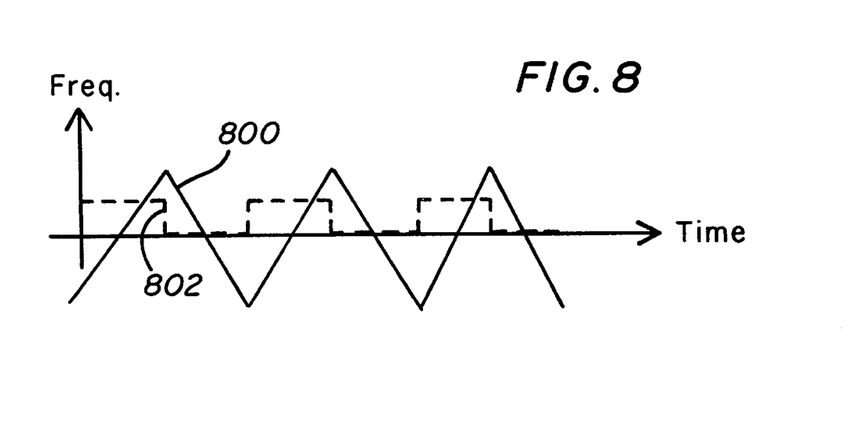
FIG. 8 illustrates a signal provided to the differentiator of FIG. 6 and the resulting output of the differentiator.

The differentiator 652 has an input connected to integrator 642. With the integrator 642 providing a signal 800 as shown in FIG. 8 when phase lock occurs, the output of the differentiator 652 will be the signal 802. Because the signal 800 increases and decreases voltage in correspondence with any increase or decrease in the frequency of F, the state of signal 802 will indicate whether F is increasing or decreasing in frequency. To provide a voltage swing to adequately drive subsequent circuitry, the output of differentiator 652 is provided through a comparator 654. The output of comparator 654 will, thus, transition between ground or a logic 0 and a logic 1 depending on whether the signal F is increasing or decreasing in frequency.

The output of comparator 654 is provided to an enable input of register 650. The output of comparator 654 is further provided through an inverter 656 to an enable input of register 648. As connected, when F is increasing in frequency the output of one of registers 648 and 650 will be enabled, and when F is decreasing in frequency the output of the other one of registers 648 and 650 will be enabled. With a processor providing different values $N_A$ and $N_B$ to registers 648 and 650, the signal transmitted from antenna 606 will make the output of the mixer 110 in the collision avoidance radar system 10 of FIG. 1 to appear as shown in FIG. 5. The values $N_A$ and $N_B$ stored in registers 648 and 650 are controlled so that the offset ΔF will cause the collision avoidance radar system to indicate an object is moving at a chosen rate (dD/dt).

Although the invention has been described above with particularity, this was merely to teach one of ordinary skill in the art how to make and use the invention. Many modifications will fall within the scope of the invention, as that scope is defined by the claims which follow.

What is claimed is:

1. A method for testing a collision avoidance radar system comprising the steps of:
   receiving a signal transmitted from an antenna of the collision avoidance radar system using a test system antenna;
   generating a signal from an oscillator tracking a frequency of the signal received using the test system antenna;
   generating an output signal by offsetting the tracking signal in frequency so that the collision avoidance radar system should indicate an object is located a distance (D) away upon receiving the output signal; and
   transmitting the output signal to the collision avoidance radar system.

2. A method for testing a collision avoidance radar system comprising the steps of:
   receiving a signal from a collision avoidance radar system;
   generating a first portion of a signal offset in frequency from the signal received from the collision avoidance radar system having a first difference in frequency from the signal received from the collision avoidance radar system when the signal from the collision avoidance radar system is increasing in frequency;
   generating a second portion of the offset signal having a second difference in frequency from the signal received from the collision avoidance radar system when the signal from the collision avoidance radar system is decreasing in frequency, the first difference in frequency and the second difference in frequency being controlled so that the collision avoidance radar system should indicate an object is moving at a rate (dD/dt) upon receiving the offset signal; and
   transmitting the offset signal to the collision avoidance radar system.

3. The method of claim 1 further comprising the step of:
   indicating the frequency range of the signal from the collision avoidance radar system as determined from generation of the tracking signal.

4. A simulator for testing a collision avoidance radar system, the simulator comprising:
   an antenna for providing a received signal from the collision avoidance radar system and providing a transmitted signal to the collision avoidance radar system;
   a first mixer having a first input, a second input and an output;
   a second mixer having a first input, a second input and an output;
   an isolator connected to the antenna for providing the received signal from the antenna to the first input of the first mixer and for providing the output of the second mixer as the transmitted signal to the antenna;
   a voltage controlled oscillator (VCO) having an output connected to the second input of the first mixer and the second input of the second mixer, and having a voltage control input;
   a phase detector having an input coupled to the output of the first mixer, the phase detector comparing a signal from the output of the first mixer with a reference signal, the phase detector having an output providing a signal to the voltage control input of the VCO to enable the VCO output to provide a signal having a frequency equal to the signal provided from the collision avoidance radar system offset by the reference signal frequency; and
   a numerically controlled oscillator (NCO) having an output connected to a first input of the second mixer and an input, the NCO providing a signal at its output equal to the reference signal frequency offset by a amount as controlled by a numerical value provided at the input of the NCO so that the collision avoidance radar system should indicate an object is located a distance (D) away upon receiving the transmitted signal.

5. The simulator of claim 4 further comprising:
   a differentiator having an input connected to the phase detector and an output; and
   a storage means receiving the differentiator output and providing a first numerical value to the input of the NCO when the output state of the differentiator indicates the VCO output should increase frequency and providing a second numerical value to the input of the NCO when the differentiator output state indicates the VCO output should decrease frequency, so that the collision avoidance radar system should indicate an object is moving at a rate (dD/dt) upon receiving the transmitted signal.

6. The simulator of claim 5 wherein the storage means comprises:
   a comparator having a first input connected to the output of the differentiator, a second input connected to a voltage reference and an output;
   an inverter having an input connected to the output of the comparator and an output;
   first register for storing a value, the first register having an output connected to the input of the NCO and having an enable input connected to the output of the inverter; and
   a second register for storing a value, the second register having an output connected to the input of the NCO and having an enable input connected to the input of the inverter.

7. The simulator of claim 4 further comprising:
   a test connection coupled to the output of the phase detector, the test connection indicating the frequency range of the received signal from the collision avoidance radar system as determined from a signal at the output of the phase detector.

8. The simulator of claim 4 wherein the phase detector is a quadrature phase detector comprising:
   a first multiplier having a first input connected to the output of the first mixer, a second input and an output;
   a second multiplier having a first input connected to the output of the first mixer, a second input and an output;
   a reference signal generator for providing the reference signal to the second input of the first multiplier and the second input of the second multiplier, the reference signal provided to the first multiplier being 90 degrees out of phase from the reference signal as provided to the second multiplier;
   a lock signal generator coupled to the output of the first multiplier, the lock signal generator providing a first signal when the first multiplier output provides substantially a DC signal of a first voltage value, and a second signal when the first multiplier output indicates the output provides substantially a DC signal of a second voltage value;
   a search signal generator having an input connected to the lock signal generator output and an output coupled through a summer to the VCO input, the search signal generator when receiving the first signal from the lock signal generator providing a varying voltage to the VCO input to sweep a frequency at the VCO output through the range of frequencies which can be provided by the signal from the collision avoidance radar system, the search signal generator when receiving the second signal from the lock signal generator disabling its output; and
   at least one integrator including a switch connected in parallel with a capacitor for coupling the output of the second multiplier through the summer to the input of the VCO, the switch being connected to the lock signal generator so that the switch is controlled to close when the lock signal generator provides the first signal and open when the lock signal generator provides the second signal.

9. The simulator of claim 8 wherein the first voltage value from the first multiplier is zero or a positive value and the second voltage value from the first multiplier is a negative value.

10. A simulator for testing a collision avoidance radar system, the simulator comprising:
   an antenna for providing a received signal from the collision avoidance radar system and providing a transmitted signal to the collision avoidance radar system;
   a first mixer having a first input, a second input and an output;
   a second mixer having a first input, a second input and an output;
   an isolator connected to the antenna for providing the received signal from the antenna to the first input of the first mixer and for providing the output of the second mixer as the transmitted signal to the antenna;
   a voltage controlled oscillator (VCO) having an output connected to the second input of the first mixer and the second input of the second mixer, and having a voltage control input;
   a numerically controlled oscillator (NCO) having an output connected to a first input of the second mixer and an input, the NCO providing a signal at its output equal to the reference signal frequency offset by a amount as controlled by a numerical value provided at the input of the NCO;
   a quadrature phase detector comprising:
      a first multiplier having a first input connected to the output of the first mixer, a second input and an output;
      a second multiplier having a first input connected to the output of the first mixer, a second input and an output;
      a reference signal generator for providing the reference signal to the second input of the first multiplier and the second input of the second multiplier, the reference signal provided to the first multiplier being 90 degrees out of phase from the reference signal as provided to the second multiplier;
      a lock signal generator coupled to the output of the first multiplier, the lock signal generator providing a first signal when the first multiplier output is absent or is a positive DC voltage value, and a second signal when the first multiplier output is a negative DC voltage value;
      a search signal generator having an input connected to the lock signal generator output and an output coupled to the VCO input, the search signal generator when receiving the first signal from the lock signal generator providing a varying voltage to the VCO input to sweep a frequency at the VCO output through the range of frequencies which can be provided by the signal from the collision avoidance radar system, the search signal generator when receiving the second signal from the lock signal generator disabling its output; and
      an integrator including a switch connected in parallel with a capacitor for coupling the output of the second multiplier through a summer to the input of the VCO, the switch being connected to the lock signal generator so that the switch is controlled to close when the lock signal generator provides the first signal and open when the lock signal generator provides the second signal;
   a differentiator having an input connected to the output of the integrator of the phase detector and an output;
   a comparator having a first input connected to the output of the differentiator, a second input connected to a voltage reference and an output;
   an inverter having an input connected to the output of the comparator and an output;
   first register for storing a value, the first register having an output connected to the input of the NCO and having an enable input connected to the output of the inverter; and
   a second register for storing a value, the second register having an output connected to the input of the NCO and having an enable input connected to the input of the inverter.

11. A simulator for testing a collision avoidance radar system, the simulator comprising:
   a first mixer having a first input coupled to receive a received signal from the collision avoidance radar system, a second input and an output;
   a second mixer having a first input, a second input and an output coupled to provide a transmitted signal to the collision avoidance radar system;
   a voltage controlled oscillator (VCO) having an output connected to the second input of the first mixer and the second input of the second mixer, and having a voltage control input;

a phase detector having an input coupled to the output of the first mixer, the phase detector comparing a signal from the output of the first mixer with a reference signal, the phase detector having an output providing a signal to the voltage control input of the VCO to enable the VCO output to provide a signal having a frequency equal to the signal provided from the collision avoidance radar system offset by the reference signal frequency; and a numerically controlled oscillator (NCO) having an output connected to a first input of the second mixer and an input, the NCO providing a signal at its output equal to the reference signal frequency offset by a amount as controlled by a numerical value provided at the input of the NCO so that the collision avoidance radar system should indicate an object is located a distance (D) away upon receiving the transmitted signal.

12. The simulator of claim 11 further comprising:

a differentiator having an input connected to the phase detector and an output; and a storage means receiving the differentiator output and providing a first numerical value to the input of the NCO when the output state of the differentiator indicates the VCO output should increase frequency and providing a second numerical value to the input of the NCO when the differentiator output state indicates the VCO output should decrease frequency, so that the collision avoidance radar system should indicate an object is moving at a rate (dD/dt) upon receiving the transmitted signal.

13. The simulator of claim 11 further comprising:

a test connection coupled to the output of the phase detector, the test connection indicating the frequency range of the received signal from the collision avoidance radar system as determined from a signal at the output of the phase detector.

* * * * *